(12) United States Patent
Rijsman (10) Patent No.: US 7,406,030 B1
(45) Date of Patent: Jul. 29, 2008

(54) DYNAMIC RENEGOTIATION OF GRACEFUL RESTART TIME TO AVOID DOUBLE-FAILURE TRAFFIC LOSS

(75) Inventor: Bruno Rijsman, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 946 days.

(21) Appl. No.: 10/647,839

(22) Filed: Aug. 25, 2003

(51) Int. Cl.
*H04L 12/28* (2006.01)
*G01R 31/08* (2006.01)

(52) U.S. Cl. .................. 370/216; 370/242; 370/351; 370/395.4

(58) Field of Classification Search ............ 370/400, 370/216, 217, 218, 235, 242, 351, 389, 395.1, 370/395.2, 398, 395.31, 395.5, 395.4, 225, 370/250, 244, 252, 253, 254
See application file for complete search history.

(56) References Cited

U.S. PATENT DOCUMENTS

| | | | |
|---|---|---|---|
| 5,848,128 A * | 12/1998 | Frey ............................ 379/9 |
| 6,542,934 B1 * | 4/2003 | Bader et al. ................ 709/239 |
| 6,751,188 B1 * | 6/2004 | Medved et al. ............. 370/216 |
| 6,910,148 B1 * | 6/2005 | Ho et al. ...................... 714/4 |
| 7,130,304 B1 * | 10/2006 | Aggarwal ................... 370/389 |
| 7,206,836 B2 * | 4/2007 | Dinker et al. ............... 709/224 |

OTHER PUBLICATIONS

Chen, Enke, et al. "Dynamic Capability for BGP-4," Network Working Group, Dec. 2002.
Sangli, Srihari R., "Graceful Restart Mechanism for BGP," Network Working Group, Jan. 2003.
U.S. Appl. No. 11/945,809, filed Nov. 27, 2007, entitled "Failsafe Management of Periodic Communications During System Upgrade for a Network Device," to Nitin Bahadur et al.

* cited by examiner

*Primary Examiner*—Hanh Nguyen
(74) *Attorney, Agent, or Firm*—Shumaker & Sieffert, P.A.

(57) ABSTRACT

Techniques are described for reducing the impact of failure of a primary and a secondary routing control unit within a network device, i.e., a double-failure of the network device. For example, a network device, such as a router, initially establishes a routing communication session between a primary routing control unit of the router and a neighboring router. The initial routing communication session has a first restart time in the event of a session failure. The router reestablishes the routing communication session with a secondary routing control unit upon failure of the primary routing control unit. The reestablished routing communication session has a second restart time that is less than first restart time. Upon recovery of the failed routing control unit, the secondary routing control unit renegotiates the restart time associated with the session to an increased value with the neighboring routers to which the reduced restart time was initially advertised.

45 Claims, 9 Drawing Sheets

FIG. 9

DYNAMIC RENEGOTIATION OF GRACEFUL RESTART TIME TO AVOID DOUBLE-FAILURE TRAFFIC LOSS

TECHNICAL FIELD

The invention relates to computer networks and, more particularly, to techniques to reduce traffic loss in the event a network device incurs a double failure.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, the secondary routing control unit assumes the responsibility of forwarding packet flows. During failover from the primary routing control unit to the secondary routing control unit, a significant period of time may elapse before the secondary routing control unit reaches a state in which it is able to process and forward packets. For example, the secondary routing control unit may need to reestablish routing communication sessions, e.g., BGP sessions, that were lost when the primary routing control unit failed. During this period, network traffic may be queued or lost.

As another technique for reducing the impact of failures, the failed router may also support "non-stop forwarding," which refers to the ability to continue forwarding packets while the routing session is reestablished. Redundant components in the failed router maintain forwarding state information during control module failure, enabling the failed router to continue forwarding packets over routes that were available in the network's last-known state. Concurrently, the failed router relearns the network topology and recalculates its routing information and forwarding information. As a result, impact on current packet flows through the network is reduced.

Some routers support "graceful restart," which refers to the capability of preserving forwarding information while restarting a routing communication session, e.g., BGP session. When establishing a routing communication session, a router that supports graceful restart advertises the capability to neighboring routers and specifies a restart time. The restart time is the estimated time that it will take for the router to reestablish the routing communication session after failure of the previous session and may be, for example, approximately 120 seconds. Upon failure of the routing communication session, the surviving router preserves forwarding information based on the expectation that the failed router will reestablish the routing communication session shortly. In other words, the surviving router will maintain the failed router within a forwarding path of the surviving router in the event of a failure of the routing communication session. Likewise, the failed router preserves forwarding information in a state that existed prior to the failure. Consequently, the surviving router does not need to find alternative routes unless the failed router does not reestablish the routing communication session within the advertised restart time. As a result, the routing instability caused by routing flaps within the network may be reduced.

SUMMARY

In general, techniques are described for reducing the impact of failure of a primary and a secondary routing control unit within a network device, i.e., a "double failure" of the network device. Although graceful restart may reduce the impact of failure of the primary routing control unit of the failed network device, it may significantly increase the impact of a double failure on network traffic.

Particularly, in the event that both the primary and the secondary routing control units fail in a network device that supports graceful restart, the neighboring network device unfortunately keeps forwarding packets to the failed network device based on the incorrect expectation that the failed router will reestablish the routing communication session shortly. In other words, the failed router will be unable to perform a graceful restart due to failure of both the primary routing control unit and secondary routing control unit. As a result, the neighboring router is forced to wait for the duration of the advertised restart time. Only upon expiration of this graceful restart period does the neighboring router begin the process of selecting one or more alternative routes through the network to bypass the failed router. During the period while the neighboring router is waiting for recovery of the failed router, which may be about 120 seconds or more, packet flows forwarded to the failed router by the neighboring device are lost.

In accordance with the principles of the invention, in order to reduce the impact of double failure, a network device, such as a router, dynamically renegotiates the restart period when the primary controller fails. Specifically, the network device initially establishes a routing communication session between the primary routing control unit and a neighboring network device, and negotiates an associated restart time for the routing communication session in the event the session fails. Upon failure of the primary routing control unit, the network device reestablishes the routing communication session with the neighboring network device via the secondary routing control unit, and negotiations a reduced restart time for the reestablished routing communication session that is less than the restart time of the initial routing communication session.

As a result, in the event of failure of the secondary routing control unit before the primary routing control unit becomes operable, i.e., a double failure, the neighboring network device only need wait the reduced restart time before beginning the process of selecting alternative routes through the network, thereby reducing impact of the double failure on traffic flow through the network. For example, the primary routing control unit may initially negotiate the graceful restart time to be on the order of 120 seconds. In the event the primary fails, the secondary routing control unit restarts the session and dynamically negotiates a reduced restart time as short as one second. In this case, the neighboring network device would almost immediately begin the process of selecting alternative routes in the event a double failure occurs.

Upon recovery of the primary routing control unit of the failed router, the secondary routing control unit automatically renegotiates with the neighboring router to reset the restart time associated with routing communication session from the reduced value to the original value. For example, the restart time may be renegotiated from 1 second back to 120 seconds. In this manner, the neighboring router only waits a reduced amount of time, e.g., 1 second, after a double failure of both the primary and secondary routing control units before selecting alternative routes, but waits for a longer period of time, e.g., 120 seconds upon recovery of the primary routing control unit when both control units are again operational.

In one embodiment, a method comprises establishing a routing communication session between a primary routing control unit of a first router and a second router, wherein the routing communication session is established to have a first restart time in the event of a session failure. The method further comprises reestablishing the routing communication session with a secondary routing control unit of the first router upon failure of the primary routing control unit, wherein the routing communication session is established to have a second restart time less than first restart time.

In another embodiment, a network device comprises a primary routing control unit that establishes a routing communication session with a neighboring network device in accordance with a routing protocol, wherein the primary routing control unit establishes the routing communication session to have a first restart time. The network device further comprises a secondary routing control unit that reestablishes the routing communication session upon failure of the primary routing control unit, wherein the secondary routing control unit reestablishes the routing communication session to have a second restart time reduced from the first restart time.

In another embodiment, a method comprises communicating restart information from a first router to a second router, wherein the restart information directs the second router to maintain the first router within a forwarding path of the second router for a first restart time period, communicating a second restart time period to the second router in response to a failure, wherein the second restart time period is reduced from the first restart time period, and renegotiating the second restart time to an increased value upon recovery from the failure.

The invention may provide one or more advantages. For example, the techniques may reduce the amount of traffic lost due to a double failure of a network device, such as a router. Particularly, neighboring routers capable of renegotiating routing capability parameters wait a reduced amount of time, e.g., 1 second, after a double failure before finding an alternative route through the network for the traffic. In this manner, the reduced restart time reduces the amount of time that neighboring routers are forwarding traffic to a failed router.

In addition, the techniques may allow the secondary routing control unit to avoid informing the neighboring routers that it is unable, at least temporarily, to support graceful restart in the event the primary routing control unit fails. This may be advantageous in situations where such an announcement may cause the neighboring routers to immediately short graceful restart and find alternative routes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
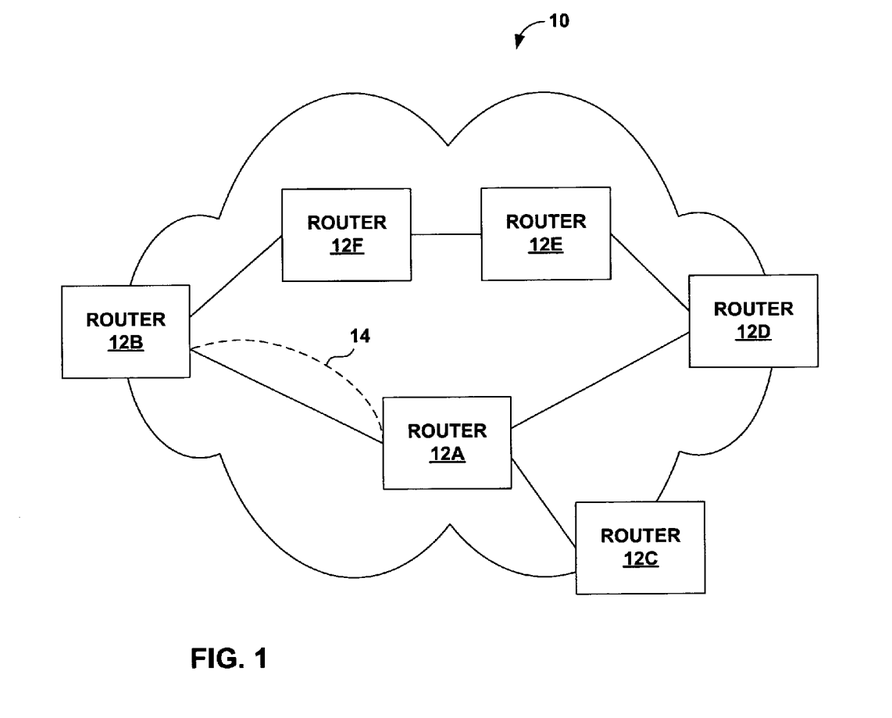
FIG. 1 is a block diagram illustrating an example computer network in which network devices reestablish routing communication sessions with reduced restart times upon failure of a primary controller in accordance with the principles of the invention.

FIG. 1 is a block diagram illustrating an example network 10 in which one or more of routers 12A-12F ("routers 12") reestablish routing communication sessions with reduced restart times upon failure of a routing control unit in accordance with the principles of the invention. For exemplary purposes, the techniques will be described in reference to router 12A.

In order to reduce the impact of failures, router 12A includes a primary routing control unit and a secondary routing control unit (not shown). In the event the primary routing control unit fails, the secondary routing control unit assumes routing responsibilities, e.g., communicating with other routers 12 to maintain routing information that reflects the topology of network 10. In addition, router 12A supports graceful restart as well as non-stop forwarding. More specifically, router 12A is able to preserve internal forwarding information while restarting a failed routing communication session, e.g., a BGP session. In other words, in the event of a session failure, router 12A is able to preserve the forwarding information in a state that existed prior to failure while reestablishing the session. Additionally, router 12A is able to continue forwarding packets in accordance with the preserved forwarding information while the routing session is reestablished.

In accordance with the principles of the invention, router 12A dynamically renegotiates the restart period when the primary controller fails in order reduce the impact of double failure of a router on network traffic. For purposes of illustration, the techniques of the invention will be described in terms of a routing communication session 14 (herein "session 14") between router 12A and router 12B. Initially, router 12A establishes session 14 with router 12B via which they exchange information in accordance with a defined routing protocol, such as Border Gateway Protocol (BGP). When establishing session 14, routers 12A and 12B exchange information that indicates routing protocol capabilities supported by each of the routers. Particularly, router 12A advertises support of graceful restart with an associated restart time, which is typically about 120 seconds, to router 12B. This informs router 12B that in the event session 14 goes down, router 12B is to maintain 12A within its forwarding path until either router 12A reestablishes routing communication session 14 or the advertised restart time elapses.

If routing communication session 14 fails due to failure of the primary routing control unit of router 12A, the secondary routing control unit of router 12A immediately takes over the routing functionality previously performed by the primary routing control unit. Particularly, the secondary routing control unit of router 12A reestablishes session 14 with router 12B and communicates restart information to router 12B. In accordance with the invention, the secondary routing control unit dynamically negotiates a restart time associated with the reestablished routing communication session 14 that is less than the restart time associated with the routing communication session initially established by the primary routing control unit.

In this manner, the restart information directs router 12B to maintain router 12A within a forwarding path of router 12B for the reduced restart time period advertised by the secondary routing control unit in the event session 14 experiences a double failure, i.e., both the primary and secondary routing control units of router 12A fail. Consequently, router 12B need only wait the reduced restart time before initiating the processes of selecting alternative routes. The reduced restart time advertised by the secondary routing control unit may be as short as 1 second, for example, in which case router 12B almost immediately selects at least one alternative route through the network upon double failure of router 12A.

While reestablishing session 14, the secondary routing control unit preserves forwarding information in a state that existed prior to the failure of the primary routing control unit. Moreover, router 12A continues to forward network traffic in accordance with the preserved forwarding information. Further, router 12B continues to forward network traffic to router 12A based on the expectation that the failed router will reestablish session 14 shortly.

In the event the primary routing control unit of router 12A recovers, the secondary routing control unit of router 12A dynamically renegotiates the restart time associated with session 14 to an increased value. In particular, secondary routing control unit resets the graceful restart time associated with session 14 to a more typical value, e.g., 120 seconds. As a result, router 12B is instructed to wait the more typical graceful restart period, e.g., 120 seconds, before finding an alternative route for network traffic once the primary routing control unit recovers.

Although for exemplary purposes graceful restart techniques for reestablishing routing communication sessions with reduced restart times are described in reference to BGP, the techniques may be applied by other routing protocols, such as Open Shortest Path First (OSPF), Intermediate System—Intermediate System (ISIS), Routing Information Protocol (RIP), Label Distribution Protocol (LDP), Resource Reservation Protocol (RSVP), or the like. Also, the invention is described in terms dynamically renegotiating a restart time associated with session 14 between router 12A and router 12B upon failure of a primary routing control unit. However, the techniques of the invention are applicable to dynamically renegotiating restart times associated with routing communication sessions between any neighboring routers 12 that support graceful restart and have two or more routing control units.

Figure 2:
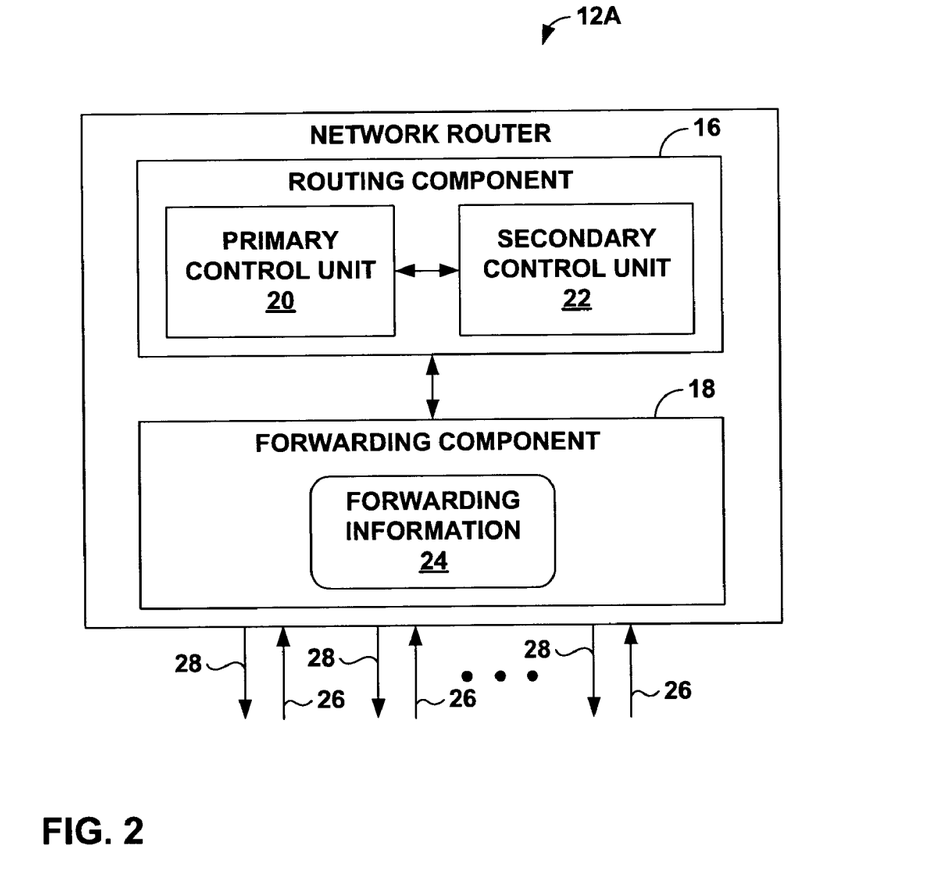
FIG. 2 is a block diagram illustrating one exemplary embodiment of a router that reestablishes routing communication sessions with reduced restart times upon failure of a primary routing control unit.

FIG. 2 is a block diagram illustrating one exemplary embodiment of a router, such as router 12A, that dynamically renegotiates a reduced restart time to avoid traffic loss in the event of a double failure. In the illustrated embodiment, router 12A includes a routing component 16 and a forwarding component 18. Routing component 16 and forwarding component 18 receive and send information to network 10 via communication links 16 and 28, respectively.

Routing component 16 includes a primary routing control unit 20 that implements one or more routing protocols to establish at least one routing communication session with neighboring routers, such as session 14 between router 12A and 12B for exemplary purposes, in order to exchange capability information as well as routing information. When establishing session 14, routers 12A and 12B exchange information that indicates particular routing protocol capabilities supported by each of the routers. For example, primary routing control unit 20 may send capability information to the router 12B via session 14 that indicates router 12A supports, for example, graceful restart, non-stop forwarding, dynamic renegotiation, and any other routing capabilities that router 12A supports. Similarly, router 12B sends capability information to router 12A indicating its capabilities, such as support of graceful restart, non-stop forwarding, and dynamic renegotiation.

In addition, router 12A and 12B may exchange routing information with one another in order to learn routes through network 10. Based on the learned routing information, primary routing control unit 20 maintains and updates routing information to describe a topology of network 10, and more particularly, routes through network 10.

Routing component 16 also includes a secondary routing control unit 22 that provides backup routing functionality to primary routing control unit 20. Particularly, secondary routing control unit 22 takes over the routing functionality performed by primary routing control unit 20 in case of a hardware or software failure of primary routing control unit 20. Secondary routing control unit 22 may, for example, execute a mirror image of the software executed by primary routing control unit 20. In some embodiments, secondary routing control unit 22 monitors primary routing control unit 20 to track routing communication sessions maintained by primary routing control unit 20. Secondary routing control unit 22 may, for example, determine whether router 12B supports dynamic renegotiation.

Routing component 16 analyzes its stored routing information and generates forwarding information 24 for forwarding component 18. Forwarding information 24 may associate, for example, network destinations with specific next hops. Forwarding component 18 forwards network traffic via communication links 26 and 28 in accordance with forwarding information 24 generated by routing component 16. As will be described in detail, forwarding component 18 may comprise a forwarding engine that is responsible for the forwarding functionality of router 12A. Alternatively, the forwarding component 18 may distribute the forwarding functionality within one or more interface cards (IFCs).

If primary routing control unit 20 fails, resulting in loss of routing communication session 14 between router 12A and 12B, secondary routing control unit 22 implements the routing protocols and reestablishes session 14 with router 12B. Additionally, secondary routing control unit 22 preserves forwarding information in a state that existed prior to failure of primary routing control unit 20. Forwarding component 18 may continue to forward network traffic in accordance with the preserved forwarding information during reestablishment of session 14. In this manner, router 12A may support, for example, non-stop forwarding of network traffic.

Further, during the period of failover from primary routing control unit 20 to secondary routing control unit 22, router 12B maintains router 12A in the forwarding path of router 12B and continues to forward traffic to router 12A. Maintaining router 12A in the forwarding path reduces problems associated with routing flaps, such as intermittent loss of network connectivity as well as increased packet loss and latency.

Upon reestablishing session 14 with router 12B, secondary routing control unit 22 may exchange capability information with router 12B. In accordance with one aspect of the invention, router 12A identifies router 12B as supporting dynamic renegotiation, and advertises a reduced restart time to router 12B. Secondary routing control unit 22 of router 12A may, for example, monitor routing communication sessions maintained by primary routing control unit 20 and identify whether router 12B advertised support of dynamic renegotiation upon initially establishing session 14 with primary routing control unit 20. In this manner, secondary routing control unit 22 can advertise a reduced restart time with sessions associated with neighboring routers that have been previously identified to support dynamic renegotiation, and advertise a standard restart time with sessions associated with neighboring routers that do not support dynamic renegotiation.

In another embodiment, secondary routing control unit 22 need not monitor sessions established by primary routing control unit 20. In this embodiment secondary routing control unit 22 initially advertises a default restart time, e.g., 120 seconds, with routing communication sessions associated with router 12B, and dynamically renegotiates the default restart time to a reduced restart time, e.g., 1 second, upon determining that router 12B supports dynamic renegotiation. Secondary routing control unit 22 may, for example, identify router 12B as supporting dynamic renegotiation based on the exchange of capability information upon reestablishment of session 14.

Upon reestablishing session 14, secondary routing control unit 22 receives and processes routing communications from router 12B to obtain updated routing information. After receiving updated routing information from router 12B, secondary routing control unit 22 updates forwarding information 24 and begins to operate normally. More specifically, secondary routing control unit 22 removes "frozen" entries, i.e., entries preserved in a state that existed prior to failure of primary routing control unit 20, of forwarding information 24. Additionally, router 12B updates its respective forwarding information in a similar manner.

In the event primary routing control unit 20 recovers, secondary routing control unit 22 renegotiates the restart time associated with session 14 to an increased value. The recovered primary routing control unit 20 now acts as a backup control unit for secondary routing control unit 22. In other words, primary routing control unit 20 becomes the secondary routing control unit and secondary routing control unit 22 becomes the primary routing control unit. In this manner, router 12B need only wait a reduced amount of time, e.g., 1 second, after a double failure before initiating route resolution to select alternative routes. However, upon recovery of primary routing control unit 20, router 12B is dynamically instructed to wait a more typical graceful restart period in the event session 14 goes down, e.g., 120 seconds, before selecting alternative routes.

Each of primary routing control unit 20 and secondary routing control unit 22 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of primary routing control unit 20 and secondary routing control unit 22 may be implemented by executing the instructions of the computer-readable medium with one or more processors, discrete hardware circuitry, firmware, software executing on a programmable processor, or a combination of any of the above.

Figure 3:
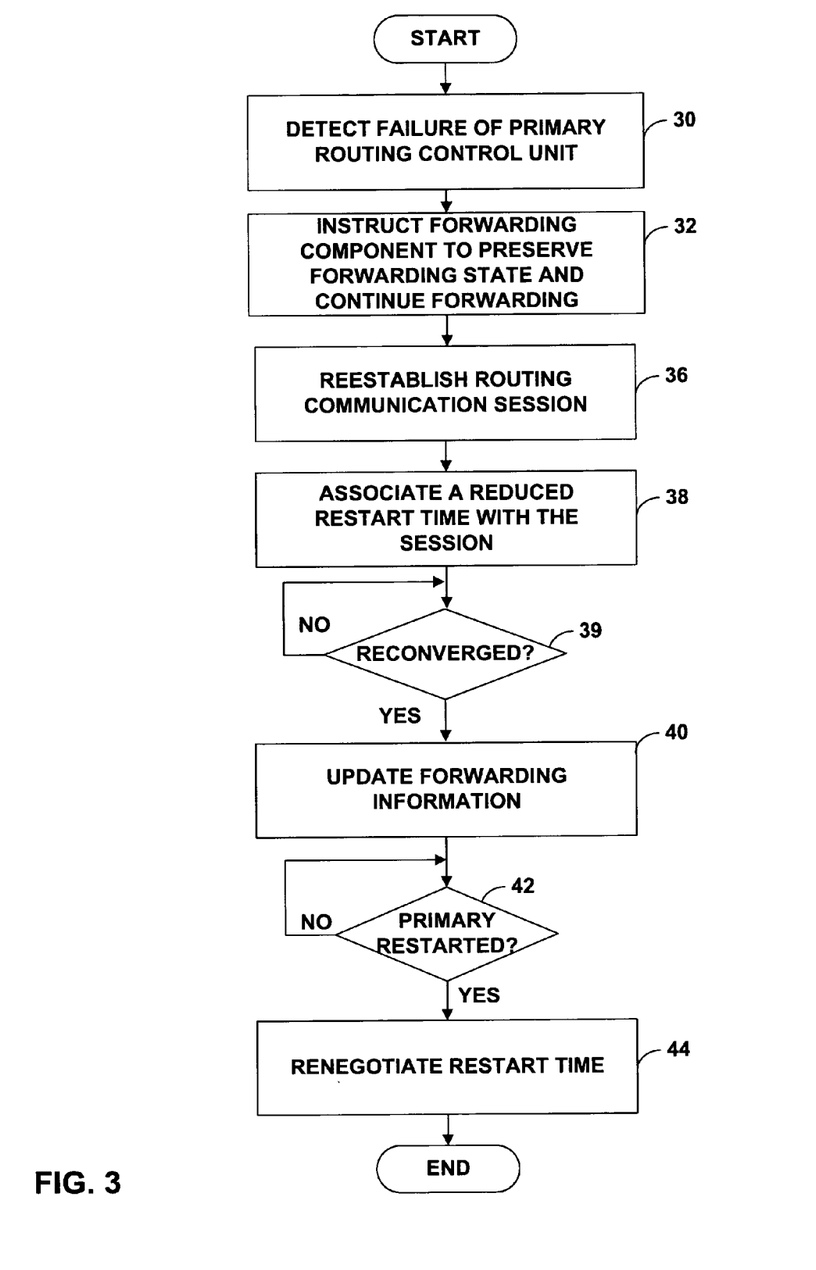
FIG. 3 is a flow diagram illustrating exemplary operation of a router reestablishing routing communication sessions with reduced restart time upon failure of a primary unit and renegotiating the reduced restart time to an increased value upon recovery of the primary routing control unit.

FIG. 3 is a flow diagram illustrating exemplary operation of a secondary routing control unit, such as secondary routing control unit 22 of router 12A. Initially, secondary routing control unit 22 detects failure of primary routing control unit 20 (30). Detecting failure of primary routing control unit 20 may happen in numerous ways. Primary routing control unit 20 may, for example, communicate a message to warn secondary routing control unit 22 of a planned failure. Alternatively, secondary routing control unit 22 may periodically send keep-alive messages to primary routing control unit 20 and detect a planned or unplanned failure of primary routing control unit 20 upon failure to receive response to the keep-alive messages.

Upon detecting failure of primary routing control unit 20, secondary routing control unit 22 directs forwarding component 18 to preserve forwarding state and continue forwarding packets (32). More specifically, secondary routing control unit 22 may direct forwarding component 18 to preserve forwarding information 24 in a state that existed prior to failure of primary routing control unit 20. Router 12A and, more particularly, forwarding component 18 forwards traffic through network 10 in accordance with the preserved forwarding information.

Next, secondary routing control unit 22 reestablishes a routing communication session 14 with neighboring routers 12, such as a router 12B (36). During this process, secondary routing control unit 22 advertises to router 12B a reduced restart time associated with the reestablished routing communication session 14 (38). Secondary routing control unit 22 identifies router 12B as supporting dynamic renegotiation, and advertises a reduced restart time, e.g., 1 second, associated with routing communication session 14. Secondary routing control unit 22 may learn that router 12B supports dynamic renegotiation in a variety of ways. For example, support for dynamic renegotiation may be learned from primary routing control unit 20 or upon reestablishing session 14 with router 12B. Secondary routing control unit 22 may advertises a default restart time, e.g., 120 seconds, associated with the routing communication sessions corresponding to neighboring routers, e.g., router 12D, in the event the neighboring routers do not support dynamic renegotiation.

Once re-convergence is complete, i.e., peer sessions have been reestablished and routing information has been received from all peers routers 12, such as router 12B (39), secondary routing control unit 22 updates forwarding information 24 (40). For example, secondary routing control unit 20 receives routing communications from router 12B via session 14, and processes the routing communications to extract routing information to identify routes through network 10. After receiving and processing the updated routing information, secondary routing control unit 22 updates forwarding information 24 to remove the "frozen" entries of forwarding information 24, i.e., entries preserved in a state that existed prior to failure of primary routing control unit 20.

In the event primary routing control unit 20 has successfully restarted and returned to full operation (42), secondary routing control unit 22 renegotiates the restart time associated with session 14 from the reduced restart time to a more typical graceful restart time (44). For example, secondary routing control unit 22 may periodically send keep-alive messages to failed primary routing control unit 20 to determine whether primary routing control unit 20 has restarted. Upon receiving a response from primary routing control unit 20, primary routing control unit 20 acts as a backup control unit for secondary routing control unit 22 and secondary routing control unit 22 renegotiates the reduced restart times to an increased value.

In this manner, if secondary routing control unit 22 fails before primary routing control unit 20 restarts, routers that support dynamic renegotiation, e.g., router 12B (FIG. 2) only waits the reduced amount of time, e.g., 1 second, before performing route resolution and selecting alternative routes. However, upon recovery of primary routing control unit 20, which provides router 12A with a backup control unit, router 12B is instructed to wait the increased restart time, e.g., 120 seconds, before performing route resolution.

Figure 4:
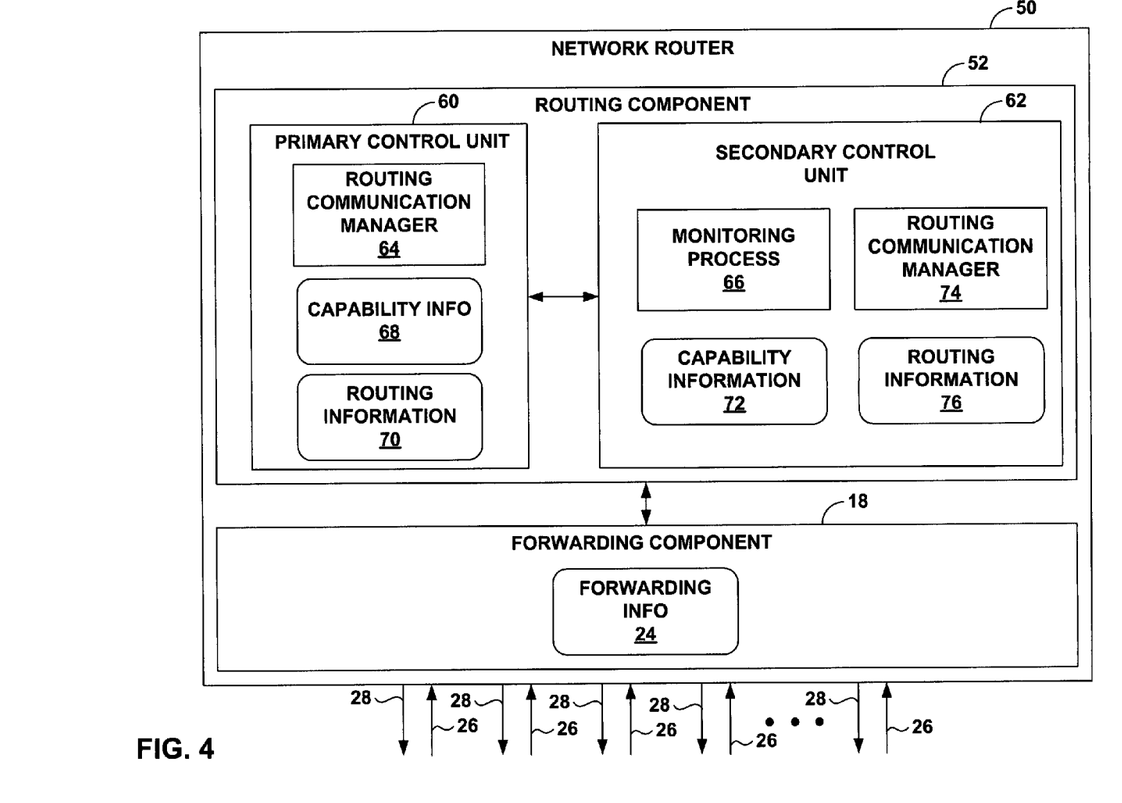
FIG. 4 is a block diagram illustrating another exemplary embodiment of a router that reestablishes routing communication sessions with reduced restart times upon failure of a primary unit.

FIG. 4 is a block diagram illustrating another exemplary embodiment of a router 50 that dynamically negotiates a reduced graceful restart time upon failure of a primary unit in accordance with the principles of the invention. Particularly, router 50 initially establishes with a neighboring router a routing communication session that has a first restart time in the event of a session failure. Router 50 reestablishes the routing communication session upon session failure to have a second restart time that is less than first restart time. Router 50 includes a routing component 52 and a forwarding component 18 that communicate traffic to and from network 10 via communication links 56 and 58, respectively. Routing component 52 is responsible for the routing functionality of router 50 and forwarding component 18 is responsible for the forwarding functionally of router 50.

Routing component 52 includes a primary routing control unit 60 and a secondary routing control unit 62. Primary routing control unit 60 includes a routing communication manager 64 that implements one or more routing protocols to establish routing communication sessions with neighboring routers. As described above, primary routing control unit 60 exchanges capability information and routing information with the neighboring routers via the established communication sessions in order to identify routing capabilities supported by the neighboring routers as well as the routes through network 10.

Secondary routing control unit 62 provides backup routing functionality to primary routing control unit 60. Particularly, secondary routing control unit 62 takes over the routing functionality performed by primary routing control unit 60 in case of a hardware or software failure of primary routing control unit 60. Secondary routing control unit 62 includes a monitoring process 66 that tracks routing communication sessions maintained by primary routing control unit 60. For example, monitoring process 66 may track the routing communication sessions maintained by primary routing control unit 60 to determine whether the neighboring router associated with each of the routing communication sessions supports dynamic renegotiation.

In operation, primary routing control unit 60 and, more particularly, routing communication manager 64, establishes routing communication sessions with neighboring routers using a defined routing protocol, such as BGP. Routing communication manager 64 receives routing communications from the neighboring routers and extracts information from the routing communications. Specifically, routing communication manager 64 may extract capability information from the routing communications to automatically generate and maintain capability information 68. Capability information 68 describes routing protocol capabilities supported by each of the neighboring routers associated with the routing communication sessions. In one embodiment, capability information 68 may, for instance, define neighboring routers that support dynamic renegotiation.

In addition, routing communication manager 64 receives information that identifies routes within network 10, and generates routing information 70 based on the communications. Primary routing control unit 60 analyzes routing information 70 and generates forwarding information 24 for forwarding component 18. Forwarding component 18 forwards traffic to destinations within network 10 in accordance with forwarding information 24. Routing information 70 and forwarding information 24 may be stored as one or more tables, link lists, radix trees, databases, flat files, or various other data structures. As described above, forwarding component 18 may comprise a forwarding engine that is responsible for the forwarding functionality of router 50 or one or more interface cards (IFCs) with forwarding functionality.

As discussed above, secondary routing control unit 62 monitors the routing communication sessions maintained between primary routing control unit 60 and neighboring routers in order to determine the routing capabilities supported by each of the neighboring routers associated with the respective communication sessions. Specifically, monitoring process 66 may receive communications from primary routing control unit 60 in response to changes in capability information 68. For example, primary routing control unit 60 may send a message indicating new communication sessions state information upon establishing a new routing communication session or loss of an existing routing communication session. Based on the communication session state communications received from primary routing control unit 60, monitoring process 66 generates and maintains capability information 72 to identify capabilities supported by neighboring routers. In one example, capability information 72 may identify neighboring routers that support dynamic renegotiation as well as graceful restart.

If secondary routing control unit 62 receives information indicating failure of primary routing control unit 60, the secondary routing control unit executes a routing communication manager 74 that implements one or more routing protocols to reestablish the failed routing communication sessions with neighboring routers. As described, router 50 may preserve forwarding information in a state prior to the failure of primary routing control unit 60, and may continue to forward network traffic in accordance with the preserved forwarding information while routing communication manager 74 reestablishes the routing communication sessions with the neighboring routers. During this period, the neighboring routers continue to forward traffic to router 50.

Routing communication manager 74 exchanges capability information with the neighboring routers according to communication session information 72 upon reestablishment of the routing communication sessions. Particularly, routing communication manager 74 advertises reduced restart times associated with sessions with neighboring routers based on communication session information 72. For example, routing communication manager 74 advertises a graceful restart time that is typically lower than the graceful restart time initially advertised by primary routing control unit 60, e.g., 1 second, to neighboring routers identified in communication session information 72 to support dynamic renegotiation. Routing communication manager 74 advertises the original graceful restart time, e.g., 120 seconds, associated with sessions with neighboring routers that do not support dynamic renegotiation.

In the event primary routing control unit 60 recovers, secondary routing control unit 62 renegotiates the reduced graceful restart time. Specifically, routing communication manager 74 increases the graceful restart time associated with sessions corresponding to routers that support dynamic renegotiation. In this manner, at least a portion of the neighboring routers need only wait a reduced amount of time, e.g., 1 second, before performing route resolution and selecting alternative routes in the event a double failure occurs. Upon recovery of primary routing control unit 60, which provides router 50 with a backup control unit, the neighboring routers are instructed to wait a standard amount of time, e.g., 120 seconds, before selecting an alternate route. Although not shown in FIG. 4, primary routing control unit 50 may include a monitoring process that functions similarly to monitoring process 66. When primary routing control unit 60 operates as standby, it may monitor secondary routing control unit 62 for failure using the monitoring process.

Figure 5:
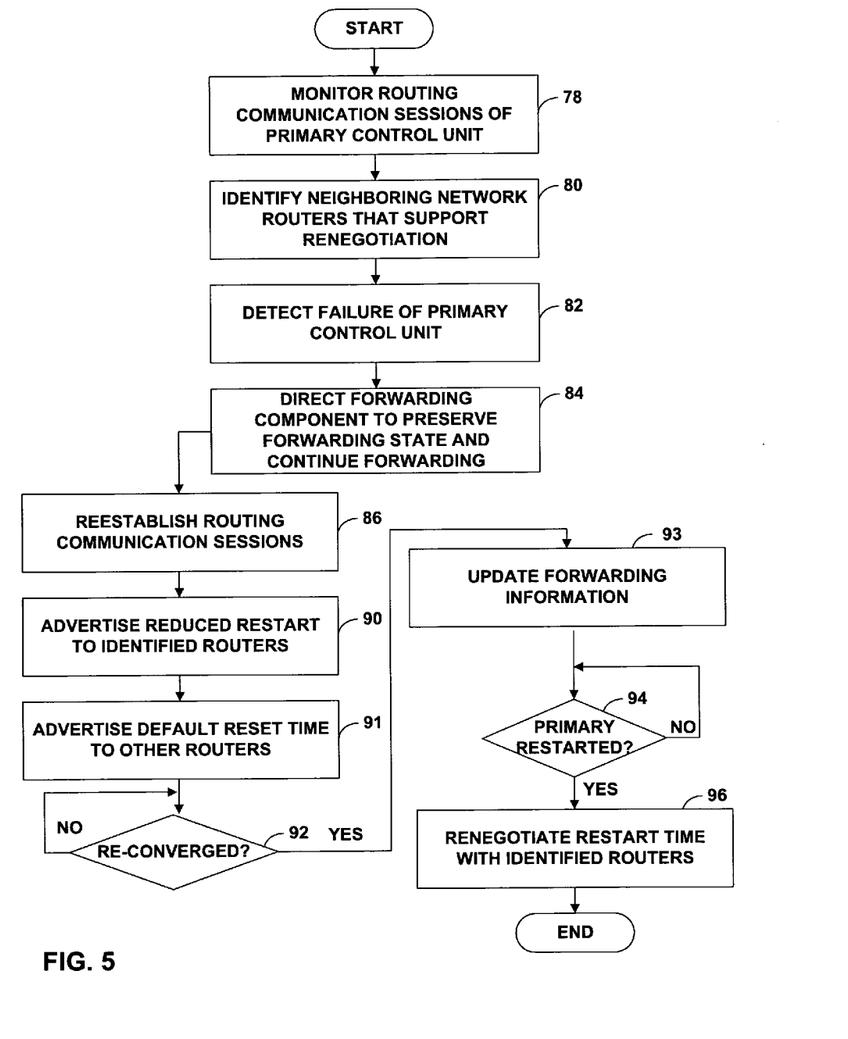
FIG. 5 is a flow diagram illustrating exemplary operation of a router reestablishing routing communication sessions with reduced restart time upon failure of a primary unit in accordance with information obtained via monitoring of the primary routing control unit.

FIG. 5 is a flow diagram illustrating exemplary operation of secondary routing control unit 62 of router 50 (FIG. 4) in further detail. Under normal operating conditions, i.e., prior to any failure, secondary routing control unit 62 monitors routing communication sessions maintained by primary routing control unit 60 (78) and identifies neighboring routers that support dynamic renegotiation as well as graceful restart (80). For example, secondary routing control unit 62 may receive messages from primary routing control unit 60 that specify new communication session state information when primary routing control unit 60 establishes a new routing communication session or loses an existing routing communication session. The new communication session state information may include, for example, a router identifier and one or more routing capabilities supported by the identified router. Secondary routing control unit 62 may generate data identifying neighboring routers that support renegotiation of graceful restart parameters based on the received communication session information.

When secondary routing control unit 62 receives information indicating failure of primary routing control unit 60 (82), secondary routing control unit 62 directs forwarding component 18 to preserve forwarding information 24 in a state prior to failure of primary routing control unit 60 and continue forwarding network traffic (84). For example, primary routing control unit 60 may communicate a message to warn secondary routing control unit 62 of a planned failure, and secondary routing control unit 62 may issue a communication directing forwarding component 18 to preserve forwarding information 24 in its current state.

Secondary routing control unit 62 reestablishes routing communication sessions with neighboring routers (86) while traffic is concurrently forwarded using the preserved forwarding state. Secondary routing control unit 62 reestablishes the failed sessions with a reduced restart time, e.g., 1 second, with neighboring routers identified to support dynamic renegotiation (90). In addition, secondary routing control unit 62 also reestablishes the failed sessions with a default restart time, such as 120 seconds, with the neighboring routers that do not support dynamic renegotiation (91). Once the sessions are reestablished and re-convergence is complete (92), secondary routing control unit 62 updates the forwarding information in accordance with the routing information received from the neighboring routers (93).

When secondary routing control unit 62 determines that primary routing control unit 60 has successfully restarted (94), the secondary routing control unit dynamically renegotiates the restart time associated with the sessions with the neighboring routers that were initially advertised the reduced restart time (96). Particularly, secondary routing control unit 62 dynamically renegotiates sessions with reduced restart times to increase the graceful restart times to the default, i.e., non-reduced, value. In this manner, if secondary routing control unit 62 fails before primary routing control unit 60 restarts, at least a portion of the neighboring routers need only wait a reduced amount of time, i.e., the reduced restart time (e.g., 1 second), before selecting alternate routes. However, upon recovery of primary routing control unit 60, which provides router 50 with a backup control unit, the neighboring routers are dynamically instructed to wait the default graceful restart time, e.g., 120 seconds, before selecting alternate routes.

Figure 6:
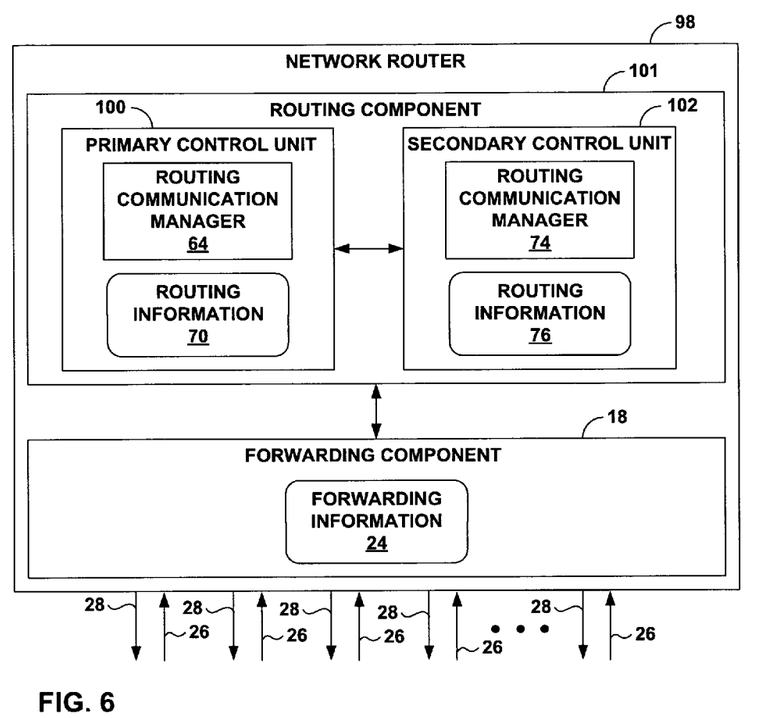
FIG. 6 is a block diagram illustrating yet another exemplary embodiment of a router that reestablishes routing communication sessions with reduced restart times upon failure of a primary unit.

FIG. 6 is a block diagram illustrating yet another exemplary embodiment of a router 98 that reestablishes routing communication sessions with reduced restart times upon failure of a primary unit. Router 98 conforms substantially to router 50 of FIG. 4, but secondary routing control unit 102 of routing component 101 does not track routing communication sessions maintained by primary routing control unit 100 to identify neighboring routers that support dynamic renegotiation. Instead, secondary routing control unit 102 identifies neighboring routers that support dynamic renegotiation via the concurrent exchange of capability information upon reestablishment of failed routing communication sessions.

More specifically, secondary routing control unit 102 reestablishes the sessions with neighboring devices with an associated default restart time, e.g., 120 seconds, to each of the neighboring routers. Secondary routing control unit 102 may then use the capability information received from the neighboring routers to identify the neighboring routers that support dynamic renegotiation and renegotiate the restart time to a reduced value for sessions corresponding to the identified neighboring routers.

Figure 7:
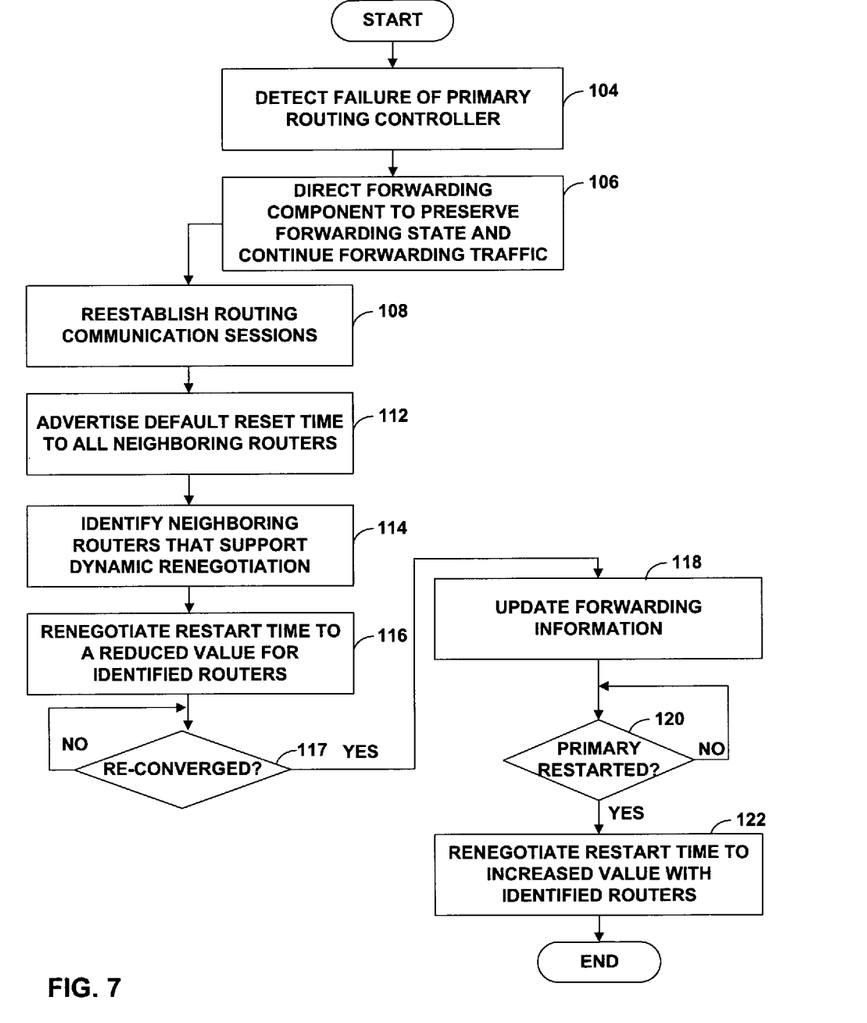
FIG. 7 is a flow diagram illustrating exemplary operation of a router reestablishing routing communication sessions with reduced restart time upon failure of a primary unit based on capability information exchanged upon reestablishing the routing communication sessions.

FIG. 7 is a flow diagram illustrating exemplary operation of router 98 of FIG. 6. Initially, secondary routing control unit 102 detects failure of primary routing control unit 100 (104), and directs forwarding component 18 to preserves forwarding information in a state of router 98 prior to failure of primary routing control unit 100 (106).

Secondary routing control unit 102 reestablishes routing communication sessions with neighboring routers (108) while traffic is concurrently forwarded using the preserved forwarding state. Secondary routing control unit 102 advertises a default restart time, e.g., 120 seconds, associated with the sessions with each of the neighboring routers (112). Secondary routing control unit 102 identifies the neighboring routers that support dynamic renegotiation (114) and renegotiates the restart time to a reduced valued for sessions corresponding to the identified neighboring routers (116). Particularly, secondary routing control unit 102 identifies neighboring routers that support dynamic renegotiation capabilities via the concurrent exchange of capability information and sends a communication to the identified routers advertising a reduced restart time. In this manner, secondary routing control unit 102 initially advertises support of the graceful restart capability with a reduced restart time to neighboring routers that support the renegotiation capability, and advertises support of the graceful restart capability with a default restart time to neighboring routers that do not support the renegotiation capability.

Once re-convergence is complete, i.e., secondary routing control unit 102 has received routing information from the neighboring routers (117), the secondary routing control unit updates the forwarding information in accordance with the received routing information (118). Secondary routing control unit 102 determines whether primary routing control unit 100 has successfully restarted (120), and renegotiates the restart time associated with the sessions with the neighboring routers that were initially advertised the reduced restart time (122).

Figure 8:
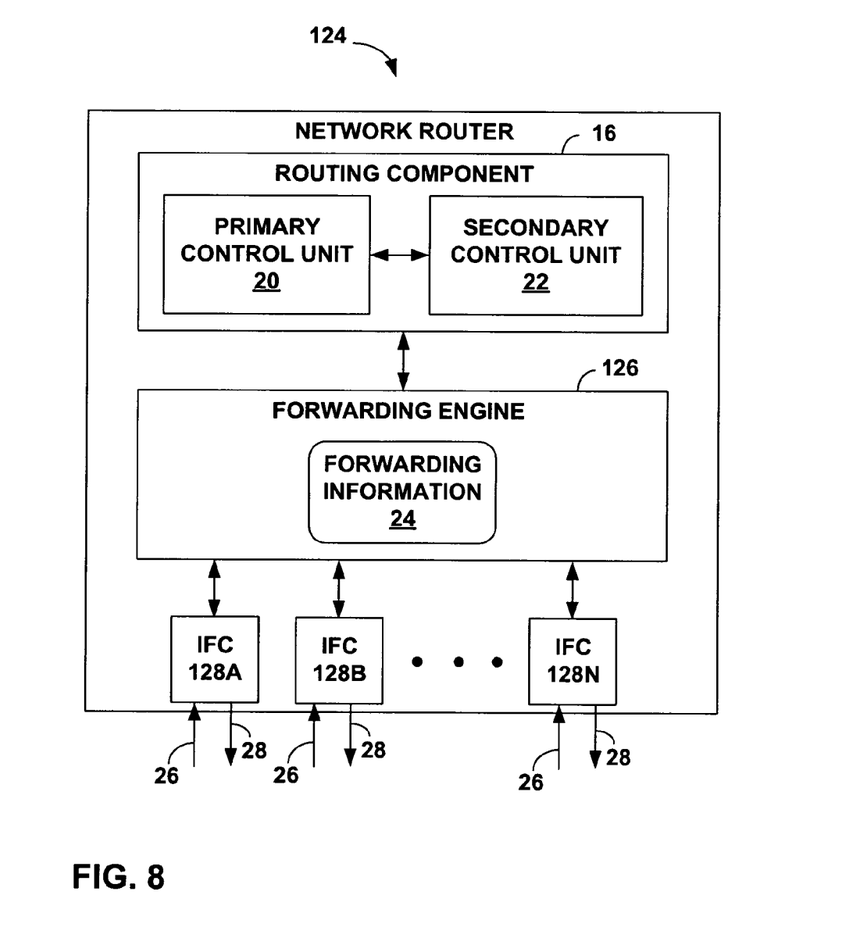
FIG. 8 is a block diagram illustrating another exemplary router that reestablishes routing communication sessions with reduced restart times upon failure of a primary unit.

FIG. 8 is a block diagram illustrating another exemplary router 124 that reestablishes routing communication sessions with reduced restart times upon failure of a primary unit. Router 124 conforms substantially to router 12A of FIG. 2, but includes a forwarding engine 126 that provides the forwarding functionality of router 124. In this manner, forwarding engine 126 performs the functions of forwarding component 18. In other words, forwarding engine 126 continues to forward network traffic in accordance with preserved forwarding information 24 while secondary routing control unit 22 reestablishes failed routing communications. Router 124 further includes interface cards (IFCs) 128A-128N ("IFCs 128") that receive and send traffic from network 10 via communication links 26 and 28, respectively.

Figure 9:
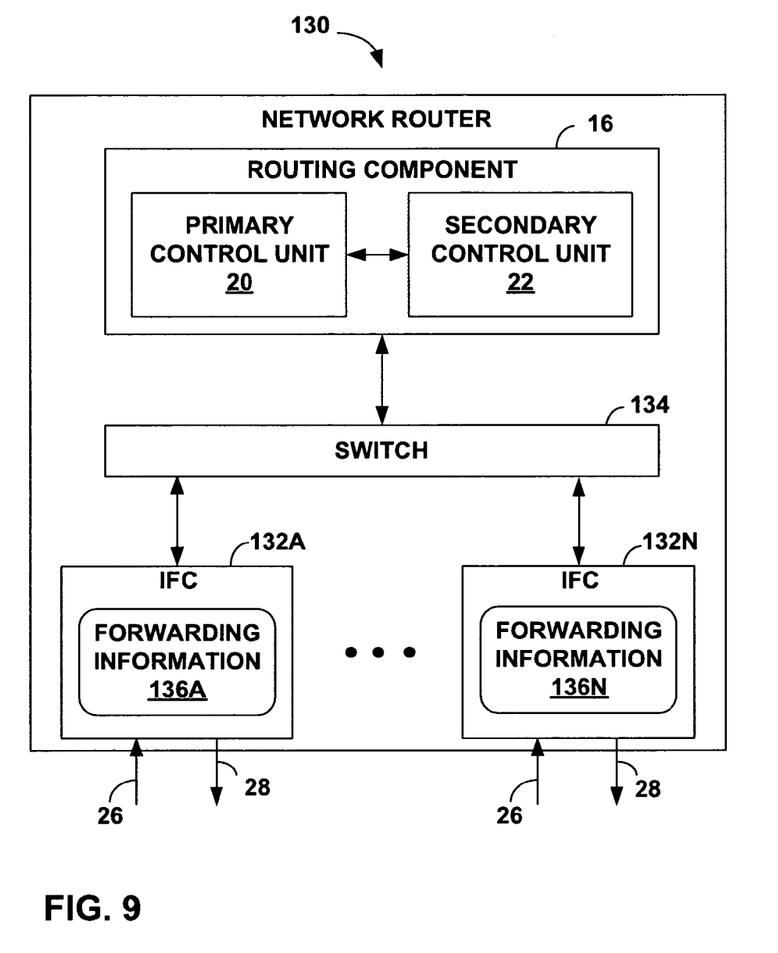
FIG. 9 is a block diagram illustrating another exemplary router that reestablishes routing communication sessions with reduced restart times upon failure of a primary unit.

FIG. 9 is a block diagram illustrating another exemplary router 130 that reestablishes routing communication session with reduced restart times upon failure of a primary unit. Router 130 conforms substantially to router 12A of FIG. 2, but includes interface cards (IFCs) 132A-132N ("IFCs 132") that are coupled to routing component 16 via switch 134. Interface cards 132 provide the forwarding functionality of router 130. In this manner, the functions of forwarding component 18 are distributed among interface cards 132. In other words, interface cards 132 continue to forward network traffic in accordance with respective forwarding information 136 while secondary routing control unit 22 reestablishes failed routing communications.

Although the principles of the invention have been described in terms of routers in a network, the principles could be applied to other types of devices. Various embodiments of the invention have been described. These and other embodiments are within the scope of the following claims.

The invention claimed is:

1. A method comprising:
   establishing a routing communication session in accordance with a routing protocol between a primary routing control unit of a first router and a second router, wherein the routing communication session is established to have a first restart time in the event of a session failure;
   reestablishing the routing communication session with a secondary routing control unit of the first router upon failure of the primary routing control unit, wherein the routing communication session is initially reestablished to have a second restart time that is substantially the same as the first restart time; and
   dynamically renegotiating the second restart time to a third restart time that is less than the first restart time upon identifying the second router as supporting dynamic renegotiation.

2. The method of claim 1, further comprising automatically renegotiating the communication session with the secondary control unit to change the restart time for the communication from the third restart time back to the first restart time upon recovery of the primary routing control unit.

3. The method of claim 1, further comprising:
   preserving forwarding information in a state of the first router prior to failure of the primary routing control unit; and
   forwarding traffic in accordance with the preserved forwarding information while reestablishing the routing communication session.

4. The method of claim 1,
   wherein each of the first restart time, the second restart time, and the third restart time specify durations of time that the second router is to wait for the first router to reestablish the routing communication session after failure of the routing communication session prior to the second router finding alternative routes that do not utilize the first router.

5. The method of claim 1, further comprising monitoring the routing communication session between the primary routing control unit and the second router to determine whether the second router supports dynamic renegotiation.

6. The method of claim 1, further comprising:
receiving information from the second router that identifies one or more routing protocol capabilities supported by the second router; and
identifying the second router as supporting dynamic renegotiation based on the capability information.

7. The method of claim 1, wherein reestablishing the routing communication comprises reestablishing the routing communication in accordance with the routing protocol.

8. The method of claim 1, wherein the routing protocol comprises one of the Border Gateway Protocol (BGP), Open Shortest Path First (OSPF), Intermediate System—Intermediate System (ISIS), Routing Information Protocol (RIP), Label Distribution Protocol (LDP), and Resource Reservation Protocol (RSVP).

9. A network device comprising:
a primary routing control unit that establishes a routing communication session with a neighboring network device in accordance with a routing protocol, wherein the primary routing control unit establishes the routing communication session to have a first restart time; and
a secondary routing control unit that reestablishes the routing communication session upon failure of the primary routing control unit, wherein the secondary routing control unit initially reestablishes the routing communication session to have a second restart time that is substantially the same as the first restart time and renegotiates the second restart time to a third restart time that is reduced from the first restart time upon identifying the neighboring router as supporting dynamic renegotiation.

10. The network device of claim 9, wherein the secondary routing control unit renegotiates the third restart time to an increased value upon recovery of the primary routing control unit.

11. The network device of claim 9, wherein the secondary routing control unit preserves forwarding information in a state of the network device prior to failure of the primary routing control unit.

12. The network device of claim 11,
wherein the secondary routing control unit receives a routing communication having updated routing information from the neighboring network device, and
wherein the secondary routing control unit extracts the updated routing information from the routing communication and updates the preserved forwarding information based on the routing communication from the neighboring network device.

13. The network device of claim 11, further comprising a forwarding component that forwards traffic in accordance with the preserved forwarding information.

14. The network device of claim 13, further comprising one or more interface cards to receive and send data flows to and from a network, and wherein the forwarding component resides within at least one of the interface cards.

15. The network device of claim 13, further comprising a forwarding engine, and wherein the forwarding component resides within the forwarding engine.

16. The network device of claim 9, wherein the secondary routing control unit monitors the routing communication session maintained by the primary routing control unit to identify the neighboring router as supporting dynamic renegotiation.

17. The network device of claim 9, wherein the secondary routing control unit receives information from the neighboring router identifying one or more routing protocol capabilities supported by the neighboring router and identifies the neighboring router as supporting dynamic renegotiation based on the received information.

18. The network device of claim 9, wherein the routing protocol comprises one of Border Gateway Protocol (BGP), Open Shortest Path First (OSPF), Intermediate System—Intermediate System (ISIS), Routing Information Protocol (RIP), Label Distribution Protocol (LDP), and Resource Reservation Protocol (RSVP).

19. A computer-readable medium comprising instructions that when executed by a processor cause a the processor to:
establish a routing communication session in accordance with a routing protocol between a primary routing control unit of a first router and a second router, wherein the routing communication session is established to have a first restart time in the event of a session failure; and
reestablish the routing communication session with a secondary routing control unit of the first router upon failure of the primary routing control unit, wherein the routing control session is initially reestablished having a second restart time that is substantially the same as the first restart time; and
renegotiate the second restart time to a third second restart time upon identifying the neighboring router as supporting dynamic renegotiation, wherein the third restart time is less than first restart time.

20. The computer-readable medium of claim 19, further comprising instructions that cause the processor to automatically renegotiate the third restart time to an increased value upon recovery of the primary routing control unit.

21. The computer-readable medium of claim 19, further comprising instructions that cause the processor to:
preserve forwarding information in a state of the first router prior to failure of the primary routing control unit; and
forward traffic in accordance with the preserved forwarding information.

22. The computer-readable medium of claim 19, further comprising instructions that cause the processor to identify the neighboring router as supporting dynamic renegotiation.

23. The computer-readable medium of claim 22, further comprising instructions to cause the processor to monitor the routing communication session between the primary routing control unit and the neighboring router to identify whether the neighboring router supports dynamic renegotiation.

24. The computer-readable medium of claim 22, further comprising instructions to cause the processor to:
receive information from the neighboring router that identifies one or more routing protocol capabilities supported by the neighboring router; and
identify the neighboring router as supporting dynamic renegotiation based on the capability information.

25. A method comprising:
establishing a session in accordance with a protocol between a primary control unit of a first device and a second device, wherein the session is established to have a first restart time in the event of a session failure;
reestablishing the session with a secondary control unit of the first device upon failure of the primary control unit, wherein the session is initially reestablished to have a second restart time that is substantially the same as the first restart time; and
dynamically renegotiating the second restart time to a third restart time upon identifying the second device as supporting dynamic renegotiation, wherein the third restart time is less than first restart time.

26. The method of claim 25, further comprising automatically renegotiating the third restart time to the first restart time upon recovery of the primary control unit.

27. The method of claim 25, further comprising:
preserving information in a state of the first device prior to failure of the primary control unit; and
forwarding traffic in accordance with the preserved information while reestablishing the session.

28. The method of claim 25, further comprising:
determining whether the second device supports dynamic renegotiation; and
selectively reducing the second restart time from the first restart time to the third restart time based on the determination.

29. The method of claim 28, wherein determining whether the second device supports dynamic renegotiation comprises monitoring the session between the primary control unit and the second device to determine whether the second device supports dynamic renegotiation.

30. The method of claim 28, wherein determining whether the second device supports dynamic renegotiation comprises:
receiving information from the second device that identifies one or more protocol capabilities supported by the second device; and
identifying the second device as supporting dynamic renegotiation based on the capability information.

31. The method of claim 25, wherein reestablishing the session comprises reestablishing the session in accordance with a routing protocol.

32. The method of claim 31, wherein the routing protocol comprises one of the Border Gateway Protocol (BGP), Open Shortest Path First (OSPF), Intermediate System—Intermediate System (ISIS), Routing Information Protocol (RIP), Label Distribution Protocol (LDP), and Resource Reservation Protocol (RSVP).

33. The method of claim 25, wherein establishing a session comprises establishing a routing session between a primary routing control unit of a first router and a second router.

34. Elements comprising:
a primary control unit that establishes a session with a neighboring network device in accordance with a protocol, wherein the primary control unit establishes the session to have a first restart time; and
a secondary control unit that reestablishes the session upon failure of the primary control unit, wherein, upon failure of the primary control unit, the secondary control unit initially reestablishes the session to have a second restart time that is substantially the same as the first restart time and renegotiates the second restart time to a third restart time that is reduced from the first restart time if the neighboring network device supports dynamic renegotiation.

35. The elements of claim 34, wherein the secondary control unit renegotiates the third restart time to an increased value upon recovery of the primary control unit.

36. The elements of claim 34, wherein the secondary control unit preserves information prior to failure of the primary routing control unit.

37. The elements of claim 36,
wherein the secondary control unit receives a communication having updated information from the neighboring network device, and
wherein the secondary control unit extracts the updated information from the communication and updates the preserved information based on the communication from the neighboring network device.

38. The elements of claim 36, further comprising a forwarding component that forwards traffic in accordance with the preserved information.

39. The elements of claim 38, further comprising one or more interface cards to receive and send data flows to and from a network, and wherein the forwarding component resides within at least one of the interface cards.

40. The elements of claim 38, further comprising a forwarding engine, and wherein the forwarding component resides within the forwarding engine.

41. The elements of claim 34, wherein the secondary routing control unit identifies the neighboring network device as supporting dynamic renegotiation.

42. The elements of claim 41, wherein the secondary control unit monitors the session to identify the neighboring network device as supporting dynamic renegotiation.

43. The elements of claim 41, wherein the secondary control unit receives information from the neighboring network device identifying one or more capabilities supported by the neighboring network device and identifies the neighboring network device as supporting dynamic renegotiation based on the received information.

44. The elements of claim 34, wherein the protocol comprises one of Border Gateway Protocol (BGP), Open Shortest Path First (OSPF), Intermediate System—Intermediate System (ISIS), Routing Information Protocol (RIP), Label Distribution Protocol (LDP), and Resource Reservation Protocol (RSVP).

45. The elements of claim 34, wherein the elements comprises elements of a network device.

* * * * *